United States Patent

Schreiner

[11] Patent Number: 5,774,049
[45] Date of Patent: Jun. 30, 1998

[54] VEHICLE TURN SIGNAL MECHANISM

[76] Inventor: Louis W. Schreiner, 2067 W. 29th Ave., Eugene, Oreg. 97405

[21] Appl. No.: 514,309

[22] Filed: Aug. 11, 1995

Related U.S. Application Data

[63] Continuation-in-part of Ser. No. 291,278, Aug. 16, 1994, abandoned.

[51] Int. Cl.$^6$ ...................................................... B60Q 1/40
[52] U.S. Cl. .................... 340/476; 200/61.27; 200/61.34
[58] Field of Search .................................. 340/475, 476, 340/477; 200/61.27, 61.34, 61.35, 61.54, 61.3

[56] References Cited

U.S. PATENT DOCUMENTS

| | | | |
|---|---|---|---|
| 2,296,585 | 9/1942 | Tobias | 340/476 |
| 3,264,422 | 8/1966 | Masserant, Jr. et al. | 200/61.34 |
| 3,725,622 | 4/1973 | O'Keefe | 200/61.27 |
| 3,778,571 | 12/1973 | Cryer | 200/61.35 |
| 3,829,638 | 8/1974 | Suzuki | 200/61.27 |
| 4,013,850 | 3/1977 | Bull | 200/61.27 |
| 4,571,470 | 2/1986 | Hattori | 200/61.27 |
| 4,880,945 | 11/1989 | Gauthier | 200/61.27 |
| 5,285,695 | 2/1994 | Di Giusto | 200/61.27 |

FOREIGN PATENT DOCUMENTS

| | | | |
|---|---|---|---|
| 3332842 | 3/1985 | Germany | 340/476 |

*Primary Examiner*—Brent A. Swarthout

[57] ABSTRACT

A vehicle turn signal mechanism wherin normal incremental oscillations of the steering wheel, required to maintain straight line travel of a vehicle, are integrated to cause the signal to automatically cancel automatically, even if the angle of turn, if any, was insufficient to cancel the turn signal.

12 Claims, 5 Drawing Sheets

VEHICLE TURN SIGNAL MECHANISM

This application is a continuation-in-part of application Ser. No. 08/291,278, filed on Aug. 16, 1994.

BACKGROUND

1. Field of the Invention

This invention relates to vehicle turn signal mechanisms that automatically cancels a turn signal after completion of a turn. More particularly, it relates to such mechanisms that automatically turn off regardless of how small a turn, if any, is made.

2. Description of Prior Art

The directional signal mechanism as presently used in vehicles to activate the directional signal lights includes a lever which has three distinct angular detent Positions consisting of a right turn position, a central (no turn) position and a left turn position. Each left or right position as selected by the vehicle operator is detented to remain latched until released by either the operator or the automatic release after completion of the turn. If the angle of turn of the vehicle is too small, the current automatic turn cancellation mechanisms will not function.

Presently used turn mechanisms depend on a positively positioned trip cam on the steering shaft which engages a trip toggle on the turn mechanism to disengage the switch after a turn is completed. Because the trip toggle engages only on the return stroke of the trip cam the steering wheel must be turned through a specific angle (recovery angle) so that the steering cam passes the turn lever trip toggle which will then be engaged. On the return stroke of the cam as the steering wheel is returned to neutral. If the turn angle of the vehicle is less than the recovery angle, the turn lever will not return to neutral and the turn signal will be cancelled. This defect is illustrated by the number of vehicles observed with their turn signal flashing while traveling straight ahead.

The prior art includes the following patents:

| | | |
|---|---|---|
| 4880945 | GAUTHIER | 11-89 |
| 5030802 | NORO | 7-91 |
| 4638290 | WAGNER | 1-87 |
| 4398175 | GAMBA | 8-83 |
| 3725622 | O'KEEFE | 4-73 |
| 4081634 | BULL | 3-78 |
| German 3332842 | WERNER | 3-85 |

All the above prior art, except Gamba, require a trip cam or equivalent, associated with the steering shaft to return the turn lever to neutral after a fixed, predetermined angular rotation of the steering shaft. Gamba depends on the swing of a pendulum to cancel a turn setting. None of the cited references are capable of accumulating subsequent oscillations of a steering shaft to guarantee eventual cancellation of a turn signal. Also, all of the prior art calls for a detent means as a separate function, independent of the turn lever, where an indexing stub resiliently urged against a notched surface performs the detent function. The cam on the steering shaft is used to overcome the resistance of the detent action to return the turn lever to neutral.

OBJECTS AND ADVANTAGES

This invention was developed specifically to eliminate the inherent defects of the above listed prior art.

The following is a list of objects of the invention:
1. To eliminate the necessity of coordinating the vehicle direction with the cam on the steering shaft during vehicle construction.
2. To simplify factory installation by not requiring coordination of turn lever trip lobe with the cam on the steering shaft.
3. To allow flexibility of choice of recovery angle.
4. To make manufacturing easier by requiring no alignment, adjustment or close tolerances.
5. To produce a turn switch which can be mounted and removed without removing the steering wheel and which mounts on one stud.
6. To allow alternate methods of recovery such as integration of normal incremental motion of the steering wheel during straight ahead driving so automatic turn cancellation will eventually occur regardless of the original turn angle.

DETAILED DESCRIPTION OF PREFERRED EMBODIMENTS

The subject invention has no cam and the detent means is an integral Dart of the turn cancellation mechanism. The turn cancellation mechanism includes frictional coupling to a cylindrical portion of the steering shaft for activating the turn lever.

Specifically, the elimination of a steering shaft cam allows more flexability of design in determining the recovery angle of turn cancellation and contributes to reliability of operation by eliminating critical alignment adjustments required to coordinate the cam orientation with the vehicle travel direction and with the location of the lever. The integration of the turn ratchet function, the detent function and frictional coupling produces an inherent built-in turn self-cancellation feature which will respond to incremental rotational oscillation of the steering wheel which is normal in straight ahead driving. If a turn is executed that is not of sufficient angle to trip the turn lever to neutral, this incremental motion of the steering shaft about it's axis 57 will be integrated to continue the motion of the turn lever in the direction of turn cancellation until the detent eventually takes over and avalanches the turn lever to neutral. None of the prior art lends itself to this feature.

Figure 1:
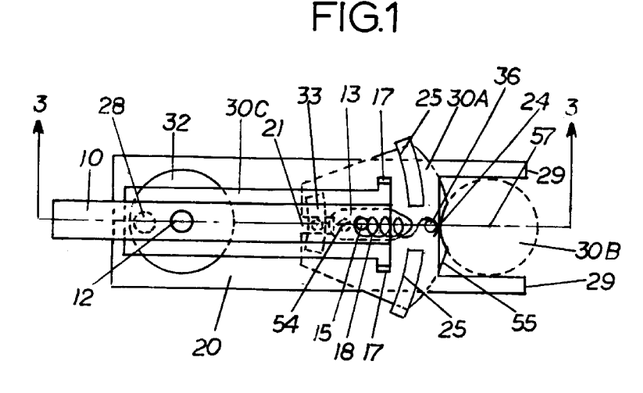
FIG. 1 is a plan view of one embodiment of a turn signal mechism made according to the invention.
Figure 2:
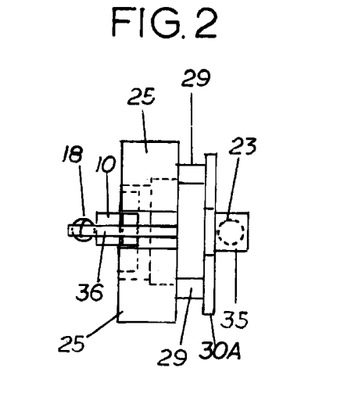
FIG. 2 is an end view of the mechanism of FIG. 1 taken from the right end of that figure.
Figure 3:
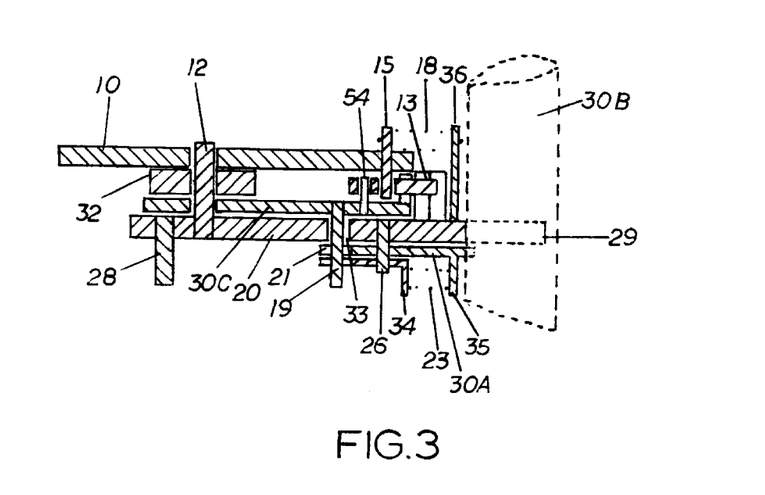
FIG. 3 is a cross-section taken along line 3—3 in FIG. 1.
Figure 4:
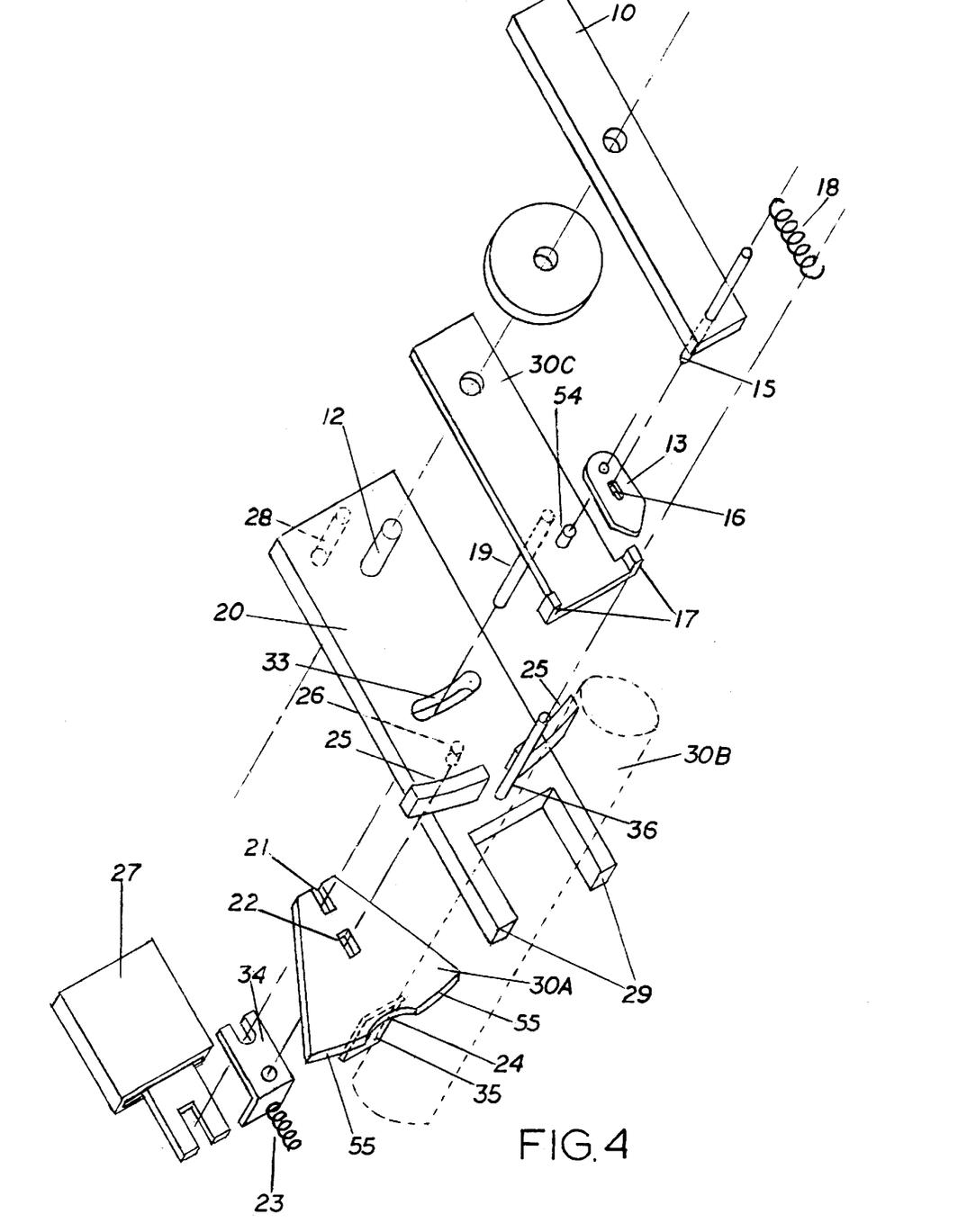
FIG. 4 is an exploded view of the mechanism of FIG. 1

An explanation of an automatically cancelling turn signal mechanism follows. Referring to FIGS. 1 and 4, the turn handle 10 and turn lever 30C are free to rotate about pivot point 12, on base member 20 which is mounted by means of stud 28, adjacent to the steering shaft 30B. The turn handle 10 is also free to rotate with respect to the turn lever, thus deactivating ratchet pawl 13 by means of pawl pin 15 which is mounted to turn handle 10 and engages slot 16 in the ratchet pawl 13 When ratchet pawl 13 strikes stop 17 on the turn lever, continued pressure on the turn handle will cause the turn lever to move thus causing pin 19 on the turn lever, which engages slot 21 in the detent toggle 30A to move detent toggle 30A in unison with the turn lever but 180° out of phase. Pin 19 on the turn lever 30C protrudes through slot 33 on the base member 20, whereby, the angular motion of the turn lever is limited by pin 19 striking the ends of slot 33 when set for a turn signal. Spacer 32 maintains proper spacing between the turn handle 10 and lever 30c.

A first signal cancellation means associated with the embodiment shown as FIG. 1 is identified as item 30, where items 30A, 30B and 30C cooperate to perform the turn cancellation function as explained below.

Figure 5:
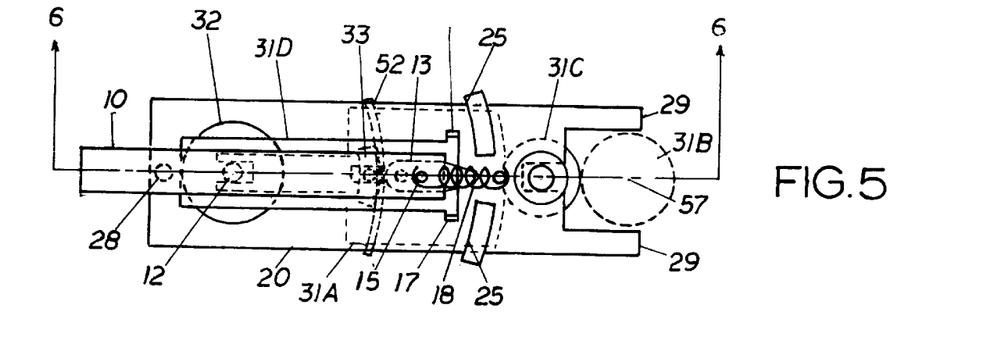
FIG. 5 is a plan view of a second embodiment of the invention.
Figure 6:
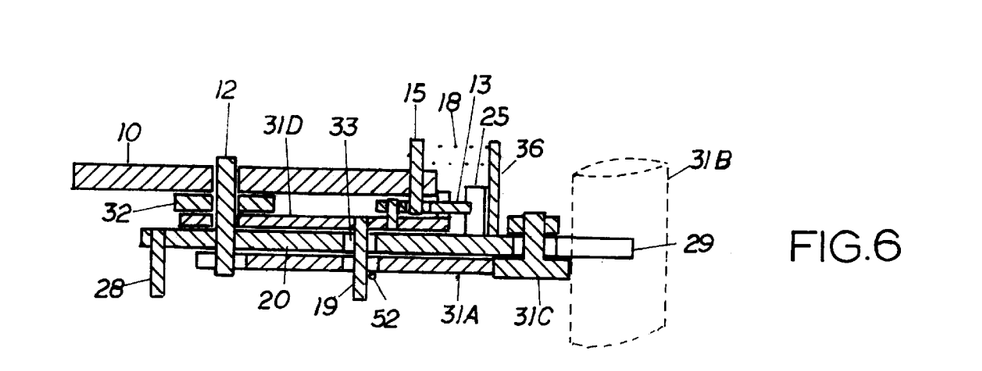
FIG. 6 is a cross-section taken along lines 6—6 in FIG. 5.
Figure 7:
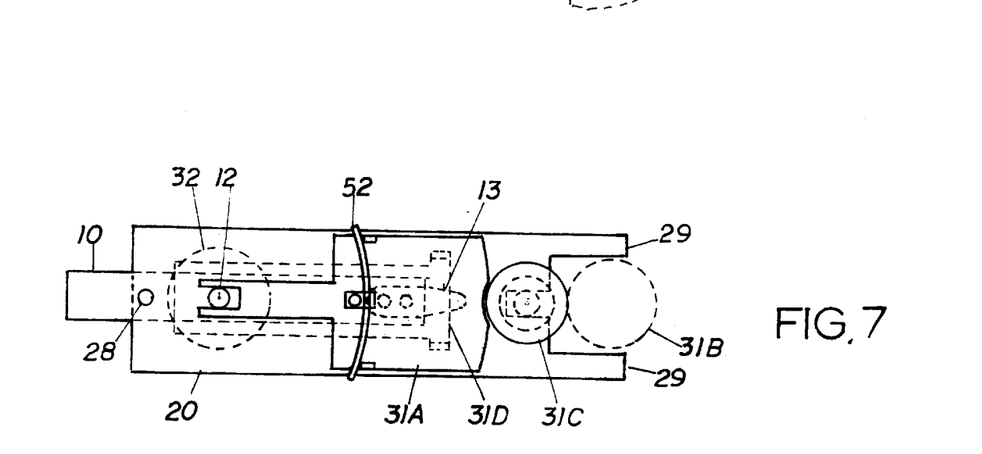
FIG. 7 is a bottom view of FIG. 5.

A second turn signal cancellation means associated with the embodiment shown as FIG. 5 is identified as item 31 where items 31A, 31B, 31C and 31D cooperate to perform the turn cancellation function as explained later.

Figure 8A:
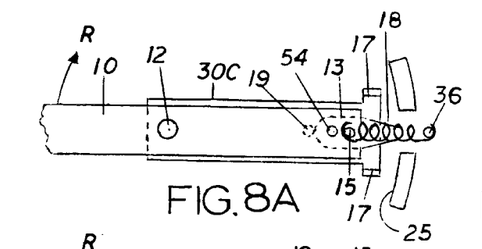
FIGS. 8A–8F are schematic presentations illustrating operation of the mechanism of FIG. 1.
Figure 8B:
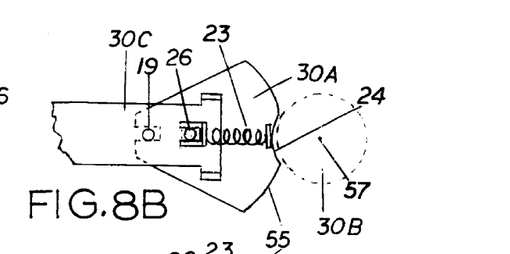
Figure 8C:
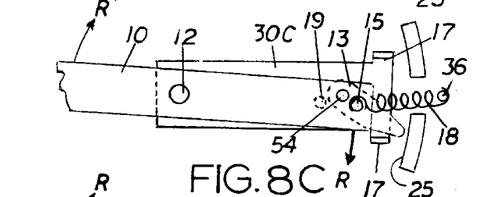
Figure 8D:
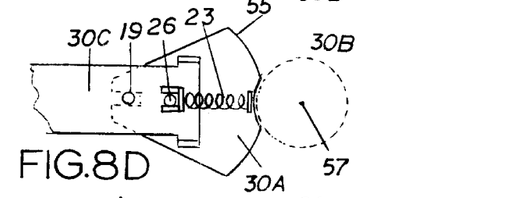

The first turn signal cancellation means is explained as follows: Referring to FIG. 8F where the detent toggle 30A and turn lever 30C are shown in the right turn signal position, detent toggle 30A is pivoted on pin 26, which is mounted to the base member, but is free to move longitudinally toward steering shaft 30B. Spring 23 which is mounted between spring pad 34 which is mounted to pin 26 and spring pad 35,which is mounted to detent toggle 30A, urges the detent toggle toward steering shaft 30 B so when the turn lever is moved to signal a turn, the notch 24 in detent toggle 30A is moved from its neutral position, embracing steering shaft 30B. At this time, detent toggle's active end 55 engages the steering shaft 30B, thus forcing the detent toggle back against spring 23, causing frictional coupling between the active end 55 of the detent toggle and steering shaft 30B. This coupling will urge the detent toggle to follow the rotation of the steering shaft.

In the illustration FIG. 8F a right turn has been called for, so the steering shaft will rotate in the direction shown by 'R'. Because the detent toggle is in the full right turn position no further motion can occur, so the frictional coupling between the steering shaft and the detent toggle will slid. As the rotation of the steering shaft is reversed, as shown by 'L', to return the vehicle to a straight ahead direction, the detent toggle will rotate as shown by 'L' and the turn lever will be moved to neutral to cancel the turn signal command.

A ratchet means is included in the turn switch mechanism which allows free motion of the turn lever in the direction to cancel the turn setting (central position) and resists motion of the turn lever toward the turn signal position.

The ratchet mechanism, well known in the art, is generally understood to be a gear and pawl that allow motion of a gear in one direction but prevents motion in the opposite direction by the pawl engaging the teeth on the gear.

In this specification, ratchet means will be construed to include various ratchet designs, including both a positive ratchet, and a modified ratchet.

A positive ratchet allows motion of a mechanism in one direction with zero force, but requires infinite force to move the mechanism in the opposite direction. The modified ratchet allows motion of a mechanism in one direction with minimal force, but requires a greater force to move the mechanism in the opposite direction.

Figure 8E:
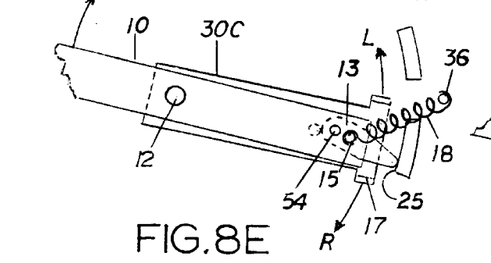
Figure 8F:
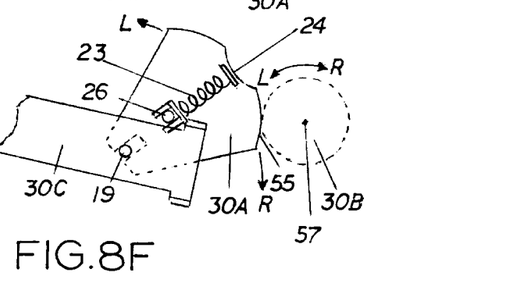

The positive ratchet function is best explained by referring to FIG. 8E where the pawl 13 is contacting ratchet race surface 25. If the turn lever 30C is moved in the direction 'L', the pawl will tend to move toward 'R' which will relieve the pressure of the pawl on the ratchet race surface 25. However, if the turn lever is moved toward 'R' the pawl will be urged toward 'L' which will cause the pawl to bind between the ratchet race surface 25 and the pin 54. This will prevent motion of the turn lever toward 'R'. Thus turn lever 30C can be moved only toward cancellation of the turn setting as urged by the detent toggle.

The modified ratchet is explained by referring to FIG. 8B and 8F, and specifically to active end 55, of the detent toggle 30A. It will be noted that as notch 24 is forced from embracing steering shaft 30B by movement of turn lever 30C, the spring 23 is compressed. If the edge 55 of the detent toggle 30A is modified so as to increase the compression progressively as the turn lever is moved toward the turn signal position, the force needed to move the turn lever will increase progressively, but as the turn lever is moved toward neutral, the pressure of spring 23 will be reduced progressively urging the turn lever toward the neutral position, thus requiring less force to move the turn lever toward neutral as compared to the force needed to move the turn lever toward the turn signal position.

The formation of detent toggle end 55 to produce a modified ratchet is better explained by referring to FIGS. 10–10C and FIGS. 11–11C. In this schematic representation of the detent toggle 30A and steering shaft 30B, the detent toggle is shown moving through various angular positions 'A', 'B' and 'C'. This illustration is different from the actual embodiment in that in the actual mechanism, the detent toggle moves back,away from the sheering shaft, to compress spring 23. In this schematic illustration, the steering shaft is depicted as moving away from the detent toggle. This configuration illustrates more clearly the actual amount of displacement between the steering shaft and the detent toggle.

Figure 10:
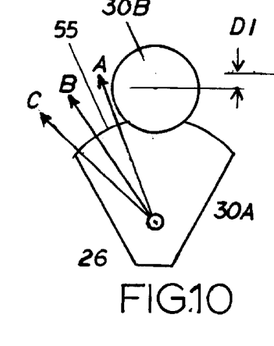
FIGS.10–10C,FIGS.11–11C and FIGS.12–12C are schematic presentations illustrating the operation of a modified ratchet.
Figure 10A:
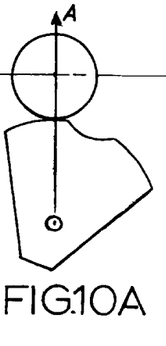
Figure 10B:
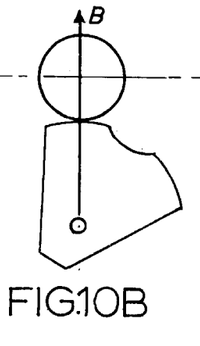

Referring to FIG. 10A, where the detent toggle is shown moved from the central position (FIG. 10) to the angular position 'A', the displacement between the detent toggle and steering shaft is shown as D1.

Figure 10C:
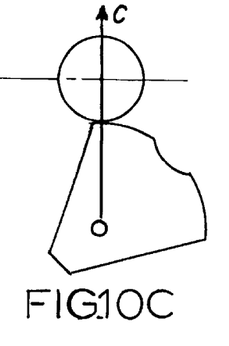

It will be noted, that as the detent toggle is moved through the angular positions 'B' and 'C', the displacement D1 does not vary. This is an example of a mechanism with no modified ratchet action, because the force to move from 'A' to 'C' or from 'C' to 'A' is constant.

Figures 11, 11A:
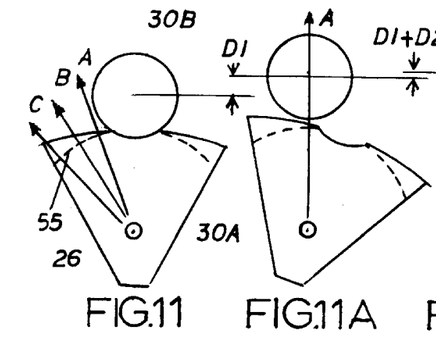
Figure 11B:
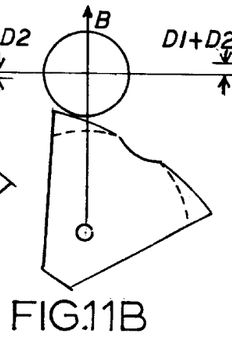
Figure 11C:
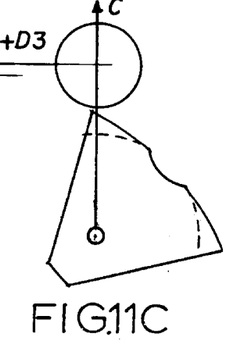

Referring to FIGS. 11–11C where the detent toggle end 55 is modified to produce a ratchet effect, the dotted line represents the original shape of detent toggle edge 55 while the solid line, indicated as item 55, has been modified to produce a ratchet action. Using the same angular position of the detent toggle as in FIGS. 10–10C, moving the toggle to position 'A' causes an initial deflection of D1. As the detent toggle moves to position 'B', the displacement is increased by the amount D2 and as the toggle moves to position 'C' the deflection is increased by the amount D3. Therefore, the compression of soring 23 is being continually increased as the toggle is moved from 'A' to 'C', requiring more force to move the toggle from 'A' to 'C' than from 'C' to 'A'. It will also be noted, referring to FIGS. 11A–11C, that because of the angle of edge 55, pressure between the detent toggle and steering shaft will urge the detent toggle toward position 'A'. This force must be overcome when moving the toggle from position 'A' to 'C'.

Figure 12:
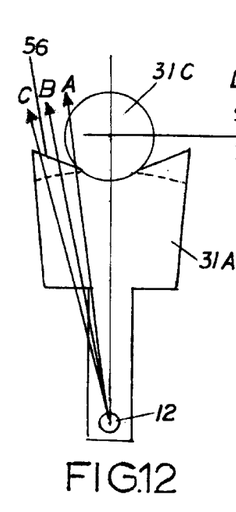
Figure 12A:
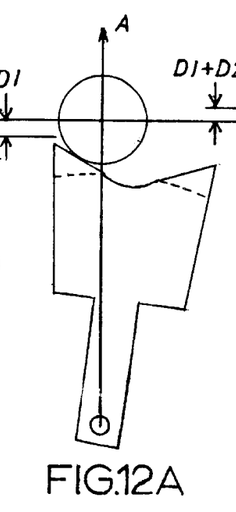
Figure 12B:
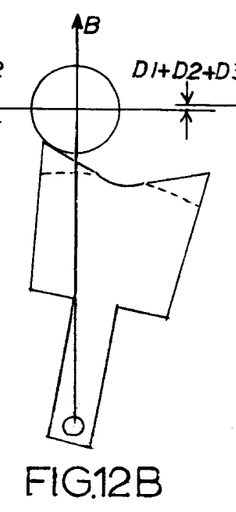
Figure 12C:
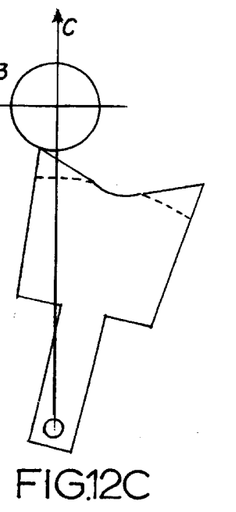

Now, referring to FIGS. 12–12C, which is regarding the index slate 31A and steering shaft 31C, end 56 is shown in its original state, of no toggle action, by the dotted lines and the modified version of end 56 is shown by solid lines. The index plate is shown in various angular Positions from 'A' to 'C' as in the above discussion of FIGS. 10–10C and FIGS. 11–11C. It will be noted that as the index plate is moved from the central, no turn positions, to angular position 'A' the initial deflection is D1. The deflection continuously increases as the plate is moved to angular position 'C'. Therefore, the pressure of spring 52 is increased for each position of the index plate thus more force is required to move the index plate from 'A' to 'C' than from 'C' to 'A'. This is the requirement for a modified ratchet. Again, noting the angle of end 56 it is obvious that the pressure between the index plate and the steering shaft will urge the index slate toward 'A'.

If the positive ratchet were operative at all times it would not be possible to move the turn lever toward 'R' to set it for a turn, so the ratchet must operate only after the turn lever is set to signal a turn.

This is explained below by referring to FIGS. 8A–8F where the turn lever and ratchet are shown as FIGS. 8A, 8C and 8E and the detent toggle 8B, 8D and 8F are shown separately for clarity but they are interconnected and work cooperatively.

FIGS. 8A and 8B shows the turn lever and detent toggle in the center or neutral (no turn) position. FIGS. 8O and 8D show the condition as a turn signal setting is initiated. Assuming a right turn is called for pressure on the turn handle 10 will move the bawl 13 in the direction 'R' until pawl 13 strikes stop 17. At this time, the pawl tip has cleared the ratchet race 25. Also, the force on the turn handle has not been enough to dislodge the notch on the detent toggle from the steering shaft. Continued force on the turn handle will move the entire turn lever mechanism into the condition shown in FIGS. 8E and 8F. As the turn handle is released, spring 18 which is mounted between spring pin 36 and pawl Pin 15 will urge the turn handle toward the center, neutral position causing the tip of pawl 13 to contact the ratchet race 25 thus setting in action the ratchet mechanism to operate as stated above, after the turn signal setting has been accomplished.

If the turn angle was insufficient to instantly return the turn lever to neutral, the incremental angular oscillation of the steering shaft will be integrated to eventually trip the turn lever back to neutral as explained below. If the initial turn angle was insufficient to trip the turn lever to neutral, the ratchet mechanism will lock the turn lever where it was last set. Each incremental oscillation of the steering shaft in the 'L' direction will cause the turn lever to move incrementally toward tripping but each incremental motion in the 'R' direction will be blocked by the ratchet. Thus the turn lever will be continuously advanced toward neutral until the detent action caused by spring 23 and notch 24 will take over and avalanche the turn lever to the neutral position.

Figure 9A:
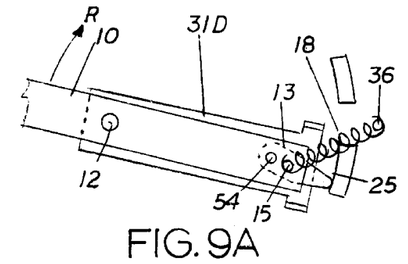
FIGS. 9A and 9B are schematic presentations illustrating operation of the embodiment of FIG. 5.
Figure 9B:
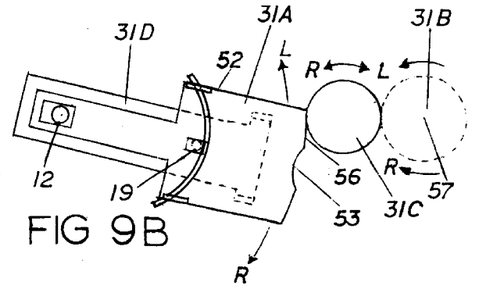

The second turn signal cancellation means associated with the embodiment shown as FIG. 5 is best explained by referring to FIGS. 9A, 9B where the turn lever and ratchet (FIG. 9A) is in the same condition as FIG. 8E where the notch 53 of the index plate 31A has left detent wheel 31C and active end 56 has contacted the detent wheel during a right turn setting. This forces index plate 31A against spring 52 causing detent wheel 31C to be forced against steering shaft 31B causing frictional coupling between the detent wheel and the steering shaft and between the detent wheel and the index plate. As the shaft is rotated as shown by 'R' to make the right turn, the detent wheel will rotate as shown by 'R' thus urging the index plate in a direction to reinforce the turn but as the turn mechanism has reached the right turn stow position, no further action is possible so the frictional coupling will slip. As the steering shaft is returned to-neutral, to return the vehicle to straight line travel, the steering shaft and detent wheel will rotate as shown by 'L' which urges the index plate and thus the turn lever to neutral. If the initial turn is insufficient to return the turn lever to neutral, the ratchet action will lock the turn lever in the last set position, then as the steering, shaft is oscillated back and forth during normal straight ahead driving, each time the shaft moves in the left turn direction the index r late and turn lever will move incrementally toward the neutral position but when the steering shaft turns in the 'R' direction the ratchet will restrain the turn lever and no movement in this direction will he possible. Each time the steering shaft moves toward 'L' the index plater will move toward the detent point until the turn lever avalanches into the neutral position.

Either embodiment of the turn signal mechanism can be coupled to operate an electrical switch such as switch 27 in FIG. 4, which is activated by pin 19.

Anyone who drives a vehicle is aware of the hazardous situation caused by a vehicle with a turn signal flashing because a turn mechanism has failed to unlatch after a turn was completed. The present invention eliminates this hazard because the turn lever will always unlatch after a turn.

In addition to this major advantage the invention does not require alignment of the turn mechanism with the steering mechanism of the vehicle thus simplifying factory installation. Also, because of the end tabs 29 on the base plate, embracing the steering shaft, only one stud 28 is needed for installation.

The description above contains many details and specifics but should not be construed as limiting the scone of the invention but merely illustrating some preferred embodiments of the invention. Thus, the scope of this invention should be determined by the appended claims and their legal equivalent.

I claim:

1. A vehicle turn signal mechanism for automatically returning a turn lever to a neutral position by means of frictional coupling to a cylindrical steering shaft rotated in response to the vehicle direction change comprising:

a base plate mounted adjacent to one side of a steering shaft of a vehicle;

a turn lever pivotally mounted to a first pivot point, disposed on an axis of said base plate, said turn lever being movable about said pivot point, from a center neutral position to a right turn angular position or to a left turn angular position, at the discretion of a vehicle driver, to indicate a turn;

a detent wheel, being disposed on said axis of said base plate, remote from said pivot point, said detent wheel being rotatable and movable along said axis of said base plate;

an index plate secured to an end of said turn lever, remote from said pivot point, by a coupling means causing said index plate to follow said angular motion of said turn lever and allowing linear action of said index plate along an axis of said turn lever, said index plate being urged away from said pivot point by a spring means, said index plate including a truncated end remote from said pivot point, said end being approximately straight, disposed at an angle of approximately 90° with said axis of said base plate, said end being bisected by a notch disposed symmetrically about said axis, said spring means urging said index plate toward said detent wheel causing said notch to embrace said wheel inducing a detent action which secures said turn lever in said center position, whereby, moving said turn lever to either of said left turn or right turn angular positions, to signal a turn, causes the index plate notch to leave said steering shaft, forcing said index plate against said spring means, causing said index plate to apply a linear force, parallel with said axis of the base plate against said detent wheel, forcing said detent wheel against said steering shaft, thereby, causing frictional coupling between said detent wheel and said steering shaft and causing frictional coupling between said detent wheel and said index plate, said frictional coupling inducing rotation to said detent wheel in unison with said steering shaft, said rotation of said detent wheel applying a tangential force to said index plate, by means of said frictional coupling, said force being transferred to said turn lever, thus forcing said turn lever back to said center position when the steering shaft is rotated in the direction to cancel the turn.

2. The vehicle turn signal mechanism of claim 1 wherein said base plate is bifurcated at one end to embrace said steering shaft, thereby, assuring accurate alignment of said steering shaft with said base plate.

3. The vehicle turn signal mechanism of claim 1, whereby, said truncated end of said index plate is adjusted in form and angle to optimize said tangential force thus optimizing the operation of said vehicle turn detector.

4. The vehicle turn signal mechanism of claim 1, wherein, said detent action is enhanced by introduction of a second spring means urging said detent wheel toward said pivot point.

5. The vehicle turn signal mechanism of claim 1, wherein, a portion of said detent wheel includes a tire constructed from a material selected from a group of materials with a higher coefficient of friction that steel, rubber being a material included in said group of materials.

6. The vehicle turn signal mechanism of claim 1, where an electrical switching means is coupled so as to be operated by said motion said turn lever, said switching means controlling a set of right turn signal lights or left turn signal lights at the discretion of said driver.

7. A vehicle turn signal mechanism for automatically returning a turn lever to a neutral position by means of frictional coupling to a cylindrical steering shaft rotated in response to the vehicle direction change comprising:

a base plate mounted adjacent to a side of a rotatable steering shaft;

a turn lever pivotally mounted to said base plate, about a first pivot point, on an axis of said base plate, said turn lever being movable about said first pivot point from a central neutral position to a right turn angular position or to a left turn angular position, at the discretion of a vehicle driver to indicate a turn;

a detent toggle mounted to a second pivot point, disposed on said axis of said base plate, near an end of said base plate remote from said first pivot point, said detent toggle including an axis bisecting said second pivot point, angular motion of said detent toggle being induced by a linkage between said turn lever and said detent toggle, said angular motion of said detent toggle being 180° out of phase with said angular motion of said turn lever, said turn lever being coupled to said detent toggle by a coupling means causing said turn lever to follow the angular motion of said detent toggle but allowing linear motion of said detent toggle along said axis of said base plate, said detent toggle being urged in a direction away from said second pivot point by a spring means, an end of said detent toggle remote from said second pivot point, having a truncated end with a notch disposed symmetrically about said axis of said detent toggle, said spring means urging said notch toward said steering shaft causing said notch to embrace said steering shaft when said turn lever is in said central position, moving said turn lever to either said left turn position, or said right turn position causes said notch to leave said steering shaft causing said detent toggle to compress said spring means causing said truncated end of said detent toggle to apply pressure to said steering shaft, said pressure causing frictional coupling between said detent toggle and said steering shaft, said detent toggle being caused to move tangently in unison with said steering shaft, the resulting movement transferred to said detent toggle causing said turn lever to return to said central position as said steering shaft is turned to cause said vehicle to recover from said turn.

8. The vehicle turn signal mechanism of claim 7, wherein, said base plate has a bifurcated end embracing said steering shaft to assure accurate alignment of said steering shaft and said base plate.

9. The vehicle turn signal mechanism of claim 7, wherein, an electrical switching means is coupled so as to be operated by said motion of said turn lever, said switching means controlling a set of left turn signal lights or right turn signal lights at the discretion of the driver.

10. The vehicle turn signal mechanism of claim 7, wherein, said truncated end includes a material selected from a group of materials having a higher coefficient of friction than steel, rubber being a material from this group.

11. The vehicle turn signal mechanism of claim 7, including a ratchet means coupled to the turn lever to prevent angular motion of the turn lever toward either of said turn angular positions due to motion of the steering shaft but allowing unrestricted motion toward the central neutral position.

12. The vehicle turn signal mechanism of claim 1, including a ratchet means coupled to the turn lever to prevent angular motion of the turn lever toward either of said turn angular positions due to motion of the steering shaft but allowing unrestricted motion of the turn lever toward the center neutral position.

* * * * *

UNITED STATES PATENT AND TRADEMARK OFFICE
CERTIFICATE OF CORRECTION

Page 1 of 2

PATENT NO. : 5,774,049
DATED : June 30, 1998
INVENTOR(S) : Louis W. Schreiner

It is certified that error appears in the above-identified patent and that said Letters Patent is hereby corrected as shown below:

Col 1 -L16, remove "Positions" and substitute ---positions---;

Col 1 -L31, remove ". On" and substitute ---on---;

Col 1 -L 34, after "will" add ---not---;

Col 2 -L41, remove "Dart" and substitute ---part---;

Col 4 -L56, remove "soring" and substitute ---spring---

Col 4 -L65, remove "slate" and substitute ---plate---

Col 5 -L 12, remove "slate" and substitute ---plate---;

Col 5 -L 24, remove "80" and substitute ---8C---;

Col 5 -L28, remove "bawl" and substitute -- pawl --;

Col 6 L-1, remove "stow" and substitute ---stop---;

Col 6 -L 10, remove "r late" and substitute ---plate---

UNITED STATES PATENT AND TRADEMARK OFFICE
CERTIFICATE OF CORRECTION

PATENT NO. : 5,774,049
DATED : June 30, 1998
INVENTOR(S) : Louis W. Schreiner

It is certified that error appears in the above-identified patent and that said Letters Patent is hereby corrected as shown below:

Col 6 -L34, remove "scone" and substitute ---scope---;

Signed and Sealed this

Tenth Day of November 1998

Attest:

BRUCE LEHMAN

Attesting Officer

Commissioner of Patents and Trademarks